United States Patent [19]

Sorine

[11] Patent Number: 4,689,002
[45] Date of Patent: Aug. 25, 1987

[54] APPARATUS FOR COLD INJECTION MOLDING OF GLASS FIBER REINFORCED COMPOSITE MATERIALS

[76] Inventor: Emile Sorine, 9 rue Arnaud de Pins, 33430 Bazas, France

[21] Appl. No.: 818,810

[22] Filed: Jan. 14, 1986

[30] Foreign Application Priority Data

Jan. 14, 1985 [EP] European Pat. Off. ........ 85450001.4

[51] Int. Cl.⁴ ............................................. B29C 45/53
[52] U.S. Cl. .................... 425/206; 425/574; 425/564; 425/578; 425/589; 425/209
[58] Field of Search ............ 425/376 R, 574, 542, 425/564, 578, 589, 201, 206, 209

[56] References Cited

U.S. PATENT DOCUMENTS

| | | | |
|---|---|---|---|
| 2,448,947 | 9/1948 | Arthur et al. | 425/578 |
| 3,354,507 | 11/1967 | Orrevad | 425/564 |
| 3,447,582 | 6/1969 | Street | 425/209 |
| 3,861,850 | 1/1975 | Wallis | 425/376 R |
| 4,099,904 | 7/1978 | Dawson | 425/564 |
| 4,386,903 | 6/1983 | Wybenga | 425/564 |
| 4,473,347 | 9/1984 | Terashima | 425/564 |
| 4,564,349 | 1/1986 | Brown | 425/376 R |
| 4,565,512 | 1/1986 | Wills et al. | |

Primary Examiner—Tim Miles
Attorney, Agent, or Firm—Robert J. Koch

[57] ABSTRACT

An apparatus for cold injection molding of glass fiber reinforced composite materials. The apparatus includes an injection unit for the composite material, a unit for the mixing of said material, the discharge orifice for the mixed material of which is connected directly with the feeder orifice of the injection unit, and a die or the like for injection of the material into the cavity of the heated mold. The unit is designed so as to discharge a sheet of the elongated material from the orifice of the cavity, in the joining plane of the mold. The dimensions of the sheet are smaller than or equal to those of the piece to be molded. The die and the mold are equipped with guillotine blades to cut the sheet at the end of the injection.

4 Claims, 2 Drawing Figures

APPARATUS FOR COLD INJECTION MOLDING OF GLASS FIBER REINFORCED COMPOSITE MATERIALS

BACKGROUND OF THE INVENTION

The processes used at the present time for production of large series of pieces of composite materials schematically employ two methods for preparation of the base product and two methods for conversion of the base product into finished pieces.

The preparation of the base product may be carried out:

1. by calendering—the product obtained is in the form of a preimpregnated sheet or SMC (sheet molding compound);
2. by mixing—the product obtained is in the form of a viscous mass of heterogeneous appearance; the "sauerkraut" or BMC (bulk molding compound).

The conversion of the base product into the finished piece is effected:

1. by compression in vertical presses. The material is first measured and then placed into an open heated mold (case of SMC and BMC);
2. by injection in horizontal injection presses. The BMC material is forced under pressure into a closed and heated mold (conventional injection) or injected under reduced pressure into a heated and semiclosed mold (injection/compression).

The mechanical properties of the molded product may vary depending on the mode of preparation of the material and the conversion method chosen for the molding within a broad range from 1000 kg/cm$^2$ of bending strength for an injected BMC to 1800 kg/cm$^2$ for the same BMC converted by compression and 2100 kg/cm$^2$ for a compression molded SMC using the same material formulation in each case.

It is advantageous to improve the method of the BMC injection to utilize the industrial advantage associated with "injection" equipment. BMC injection is the easiest and most economical process to apply industrially but yields pieces with the poorest mechanical properties.

SUMMARY OF THE INVENTION

It is an object of the invention to provide a novel injection molding apparatus and to avoid damage to reinforcing fibers between a mixing device and mold enclosures.

An object of the invention is to provide a cold injection molding apparatus for glass fiber reinforced composite materials, having a composite material injection unit and a mixing unit for the material. The discharge orifice of the mixed material is connected directly to the feeder orifice of the injection unit. A die or the like, for injection of the material into the cavity of a heated mold is designed to discharge from the orifice of said cavity a sheet of the material of elongated shape in the joining plane of the mold. The dimensions of the sheet are less than or equal to those of the piece to be molded. The die and the mold are equipped with guillotine blades to cut the sheet at the end of the injection.

The injection pressure is of the order of 20 to 100 kg/cm$^2$ instead of the conventional pressure of the order of 1000 to 2000 kg/cm$^2$ due to large dimensions of the injection sheet. This makes possible a reduction in the velocity of the material issuing from the outlet orifice of the injection device.

Further characteristics and advantages will become apparent from the description of an embodiment of the apparatus according to the invention. The description is presented as an example only with reference to the drawings attached hereto.

DETAILED DESCRIPTION OF THE PREFERRED EMBODIMENT

Figure 1:
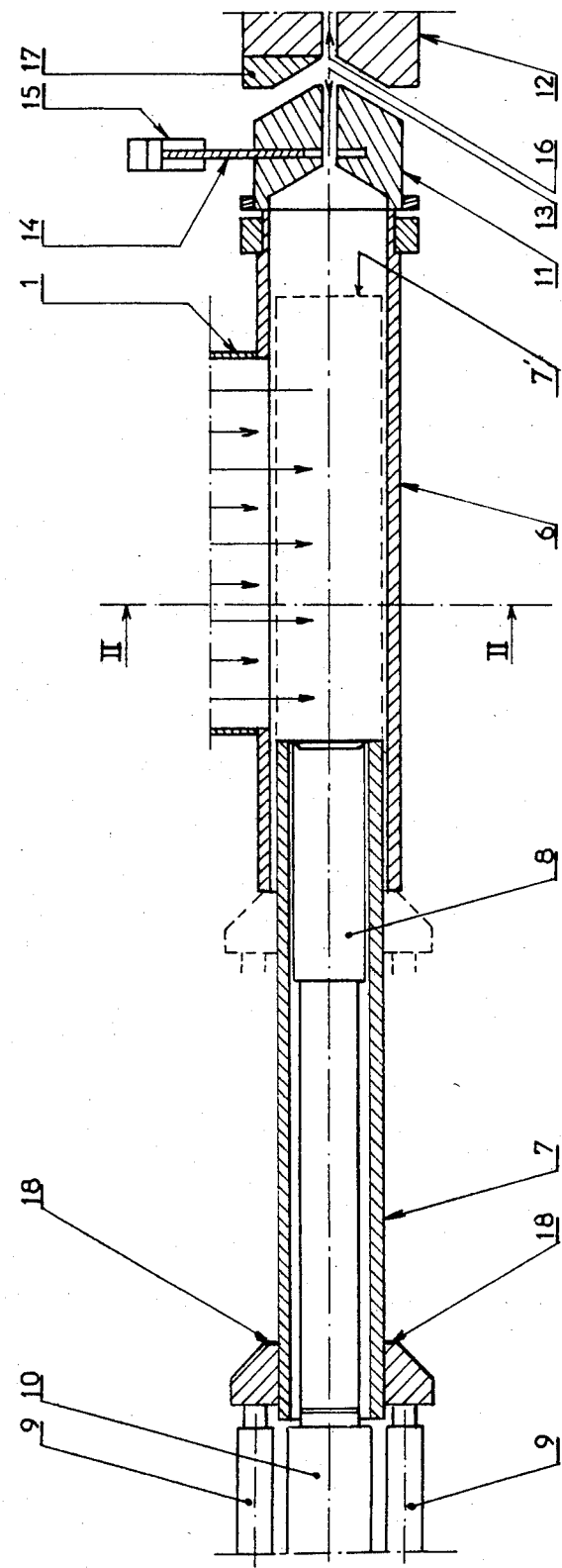
FIG. 1 shows an axial section view of a preferred embodiment of the invention.

The apparatus shown in the drawings is a mixing vessel 1 in the form of a trough with an open bottom in its center part 2. The walls on either side of said opening 2 (of a rectangular shape) are cylindrical in order to accomodate two mixing rollers 3 mounted in a mobile manner and with their axes parallel to the longitudinal axis of the opening inside the vessel. The rollers 3 are in contact with said cylindrical parts of the vessel 1 and are mounted on the end of arms 4, which are mounted rotatingly around axles 5 integral with the axes of said cylindrical parts. The means for driving the arms 4 (not shown in FIG. 2) are conventional drive units, for example, a geared electric motor.

The mixing vessel 1 is surrounded by a premixer (not shown) in the form of a hopper receiving the different ingredients to be mixed. They are exposed to agitation prior to their introduction into the mixing vessel 1.

The orifice 2 communicates with the inside of a hollow injection cylinder 6, in which a bush 7 and an injection piston 8 inside said bush are displaceable.

The bush 7 is thin and is in sliding contact with the inner wall of the cylinder 6. It is driven by two fixedly mounted hydraulic jacks 9. The piston 8 is equipped with a hydraulic jack 10 also mounted fixedly.

The assembly 1-6 is mounted in a mobile manner in axial translation with respect to the cylinder 6 in order to place an injection die 11 fastened to the end of the cylinder 6 against the orifice of a heated mold shown schematically at 12.

The die 11 comprises a circular inlet chamber, the cross-section of which narrows in order to open into an injection chamber 13 designed to discharge, for example, a thin and relatively wide sheet with a rectangular cross section, whose plane is perpendicular to that of FIG. 1. The neck of the die 11 is tapered in order to facilitate its connection to the mold 12. A guillotine blade 14 equipped with a jack 15 is provided to cut the sheet injected from the die at the end of the injection.

The mold 12 is intended to operate according to a method of injection compression. The mold is mounted stationarily and its injection orifice 16 located in its joining plane corresponds to the dimensions of the orifice of the chamber 13. The mold 12 comprises a guillotine device shown schematically at 17 to cut the injection sheet following the completion of the injection. Blade 14 may be first activated, followed by the activation of blade 17. The material remaining may be pushed into the mold during the next injection sequence, interim polymerization being minimized as a result of the fact that a cold injection molding process is being undertaken.

Following a certain mixing period in the vessel 1 which is a function of the nature of the ingredients used, the bush 7 which is in its position 7' (FIG. 1) closing off the opening 2, is moved into a retracted position to permit the filling of the inside of the cylinder 6. Subsequently, the bush 7 is returned into its position 7', except that the jacks 9 continue their action in order to thrust the assembly (1–6, 11) against the mold 12 by means of the stops 18 abutting against the end of the cylinder 6, thereby firmly applying the injection assembly against the mold for the injection period. The piston 8 is then actuated to push the contents of the cylinder 6 into the die 11 and then the mold 12.

At the completion of the injection, the guillotines 14, 17 are actuated, the piston 8 is returned into its initial position and the assembly 1–6, 11 is returned into the position of FIG. 1. If the mixture in the vessel 1 is not in the required position or properly mixed, the bush 7 would remain in its extended position. The operation of compression of the mold 12 may be effected following the actuation of the guillotines.

The components (nature and proportions) of the thermosetting materials used in the apparatus of the invention are common such as mineral fillers, resins and additives, together with fiber fillers such as glass fibers in particular.

Figure 2:
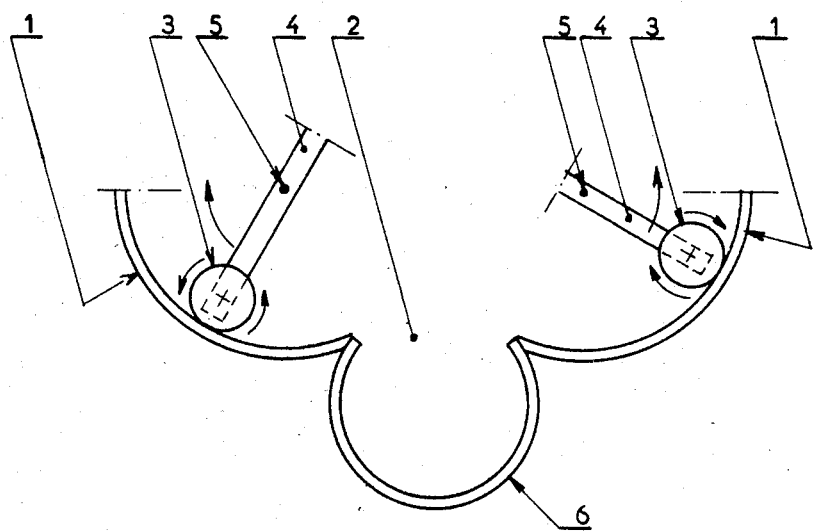
FIG. 2 shows a transverse section view on the line II—II of the unit of FIG. 1, together with the associated mixing device.

The mixing device shown schematically in FIG. 2 applies a minimum of force to the glass or other fibers, while insuring their satisfactory impregnation by the resin. The action on the mixture of the rollers 3 in cooperation with the cylindrical vessel 1 is equivalent to calendering while avoiding any grinding or damaging the fibers.

The injection sheet may have a cross section with a variable contour, assuming the cross section of the piece to be molded.

In view of the large dimensions of the injection sheet, the injection pressure is of the order of 20 to 100 kg/cm$^2$ instead of the usual pressures of the order of 1000 to 2000 kg/cm$^2$. A reduction of the velocity of the passage of the material from the outlet orifice of the injection device is thus possible.

Advantages of an apparatus according to the invention are numerous and make it possible to supply the market with large pieces at a high production rate (automotive, construction, etc.).

The following additional advantages result from the invention:

A reduction of the cost of composite materials manufactured at the place of utilization, which also allows extended and safe storage of the basic components.

Injecting a wide sheet at low pressures and velocities without damage to the fiber reinforcements is possible.

A significant reduction of the injection pressure associated with the strong increase of the surface area of the inlet threshold of the material into the mold results in a reduction in the required mechanical strength of the tools and their associated cost.

The pressure required to close the mold is reduced.

The risk of damage to the injection unit in case of an intended or unintended stoppage of the injection cycle is eliminated.

Injection capacities (volume and frontal surface of the pieces) are increased.

The invention is not limited to the embodiment shown and described hereinabove. It covers all variants, in particular those concerning the forms, dimensions and layout of the injection die or other appropriate injection means, the structure of the injection unit and the layout of the mixing unit directly connected with the injection unit.

I claim:

1. Apparatus for cold injection molding of glass fiber reinforced composite materials, comprising:
   a composite material injection unit, a mixing unit associated with the injection unit and having an orifice for discharge of mixed material connected directly with a feeder orifice of the injection unit;
   an injection die associated with an outlet of the injection unit for discharging an elongated sheet of material into a cavity of a heated mold in a joining plane of the mold through an orifice of said cavity, the sheet of material having dimensions smaller than or equal to dimensions of a piece to be molded; and
   wherein the die and the mold are equipped with guillotine blades to cut the sheet after injection is terminated.

2. An apparatus according to claim 1, wherein said mixing unit further comprises:
   a vessel, the bottom whereof exhibits cylindrical parts, mixing rollers for rolling against said cylindrical parts, means for driving said rollers in rotation inside said vessel; and
   a discharge orifice in the bottom of the vessel to place the vessel in communication with the injection unit and a mobile closing element controlling flow through said discharge orifice.

3. An apparatus according to claim 2, wherein the injection unit exhibits a cylinder portion and communicates with said mixing unit through an orifice closable by means of a bush, mobile in said cylinder, and further comprises an injection piston displaceably mounted inside the cylinder and the bush; and
   an injection die with a guillotine blade located at one end of the injection cylinder, wherein the mixing unit and injection unit are displaceably mounted in relation to the mold.

4. An apparatus according to claim 1, wherein the injection unit exhibits a cylinder portion and communicates with said mixing unit through an orifice closable by means of a bush, mobile in said cylinder, and further comprises an injection piston displaceably mounted inside the cylinder and the bush; and
   an injection die with a guillotine blade located at one end of the injection cylinder, wherein the mixing unit and injection unit are displaceably mounted in relation to the mold.

* * * * *